(12) United States Patent
Day (10) Patent No.: US 10,336,410 B1
(45) Date of Patent: *Jul. 2, 2019

(54) MARINE VESSEL WITH MOVING CONTROL UNIT

(71) Applicant: Thomas M. Day, Bellingham, WA (US)

(72) Inventor: Thomas M. Day, Bellingham, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/980,586

(22) Filed: May 15, 2018

Related U.S. Application Data (63) Continuation of application No. 15/608,736, filed on May 30, 2017, now Pat. No. 9,969,467, which is a continuation-in-part of application No. 15/178,214, filed on Jun. 9, 2016, now Pat. No. 9,663,196.

(51) Int. Cl.
| | |
|---|---|
| *B63B 29/00* | (2006.01) |
| *B63B 29/02* | (2006.01) |
| *B25J 5/02* | (2006.01) |
| *B63B 9/00* | (2006.01) |

(Continued)

(52) U.S. Cl.
CPC .............. *B63B 29/025* (2013.01); *B25J 5/02* (2013.01); *B63B 9/00* (2013.01); *B25J 5/00* (2013.01); *B63B 15/00* (2013.01)

(58) Field of Classification Search
CPC ................................................. B63B 29/025
See application file for complete search history.

(56) References Cited

U.S. PATENT DOCUMENTS

| | | | | |
|---|---|---|---|---|
| 2,339,782 | A | * | 1/1944 | Johnson .................... B63B 7/04 114/352 |
| 2,341,866 | A | | 2/1944 | Jackson |
| 2,476,319 | A | | 7/1949 | Norris |

(Continued)

FOREIGN PATENT DOCUMENTS

| | | |
|---|---|---|
| JP | 2002114191 A | 4/2002 |
| RU | 2041118 C1 | 8/1995 |
| WO | 2016209709 A1 | 12/2016 |

OTHER PUBLICATIONS

International Searching Authority, International Search Report and Written Opinion, PCT/US2016/37830, dated Oct. 20, 2016, 7 pages.

*Primary Examiner* — Stephen P Avila
(74) *Attorney, Agent, or Firm* — Schacht Law Office, Inc.; Dwayne Rogge (57) ABSTRACT

Disclosed herein is a marine vessel, which in one example comprises a substantially continuous deck. Also disclosed is an example with a plurality of parallel longitudinally aligned channels extending from the forward deck to the aft deck. The vessel having a vessel cabin resting on and longitudinally movable upon the deck. The vessel cabin in one example having a plurality of rolling wheels attached thereto; wherein the rolling wheels roll upon the deck and allow longitudinal movement of the vessel cabin between the aft region and the forward region. A drive unit (motor) may be provided. The drive unit optionally mounted to the cabin and in one example having a drive wheel mounted to the drive unit and configured to rotate the drive wheel. The drive wheel(s) contacting the deck such that rotation of the drive wheel repositions the cabin between the aft region and the forward region.

19 Claims, 4 Drawing Sheets

(51) Int. Cl.
 *B25J 5/00* (2006.01)
 *B63B 15/00* (2006.01)

(56) References Cited

U.S. PATENT DOCUMENTS

| | | | |
|---|---|---|---|
| 2,568,330 A | 9/1951 | Flippin | |
| 2,804,838 A * | 9/1957 | Moser | B63H 21/265 |
| | | | 114/153 |
| 3,468,280 A | 9/1969 | Williams | |
| 3,634,897 A | 1/1972 | Cuccio | |
| 3,705,737 A | 12/1972 | Westerlund et al. | |
| 3,846,860 A | 11/1974 | Kummerman | |
| 3,879,784 A | 4/1975 | Kummerman | |
| 4,158,416 A | 6/1979 | Podesta | |
| 4,161,795 A | 7/1979 | Quest | |
| 4,293,967 A | 10/1981 | Ord | |
| 4,681,054 A | 7/1987 | Rice et al. | |
| 5,191,854 A | 3/1993 | Lehmann et al. | |
| 6,067,926 A | 5/2000 | Robinson | |
| 6,223,669 B1 | 5/2001 | Bowden | |
| 6,298,801 B1 | 10/2001 | May | |
| 6,792,886 B1 | 9/2004 | Maloney et al. | |
| 7,621,230 B1 | 11/2009 | Anderson et al. | |
| 7,712,727 B1 | 5/2010 | Cole | |
| 9,409,630 B1 | 8/2016 | Day | |
| 9,570,249 B1 * | 2/2017 | Douglas | H01H 9/025 |
| 9,663,196 B1 | 5/2017 | Day | |
| 9,873,490 B2 | 1/2018 | Day | |
| 9,969,467 B1 * | 5/2018 | Day | B63B 29/025 |
| 2001/0025595 A1 | 10/2001 | Mielke et al. | |
| 2002/0164231 A1 | 11/2002 | Lucas et al. | |
| 2003/0217681 A1 | 11/2003 | Funk | |
| 2006/0060128 A1 | 3/2006 | Bailey et al. | |
| 2007/0163484 A1 | 7/2007 | Eng et al. | |
| 2011/0247538 A1 | 10/2011 | Gimpel et al. | |
| 2013/0074752 A1 | 3/2013 | Chacon et al. | |
| 2014/0000501 A1 | 1/2014 | Ulgen | |
| 2014/0076227 A1 | 3/2014 | Saccenti | |
| 2014/0158038 A1 | 6/2014 | Johnston | |
| 2014/0165893 A1 | 6/2014 | Lawson | |
| 2014/0239647 A1 | 8/2014 | Jadallah et al. | |

* cited by examiner

MARINE VESSEL WITH MOVING CONTROL UNIT

RELATED APPLICATIONS

This application is a Continuation of U.S. patent application Ser. No. 15/608,736 filed on May 30, 2017, incorporated herein by reference. U.S. patent application Ser. No. 15/608,736 filed on May 30, 2017 is a Continuation-In-Part of and claims priority benefit of U.S. Ser. No. 15/178,214 filed Jun. 9, 2016, incorporated herein by reference.

BACKGROUND OF THE DISCLOSURE

Field of the Disclosure

This application relates to the field of marine vessels (boats) with a cabin (space for the crew, cargo, or passengers in the vessel) or other control unit/control panel that can be moved along the vessel and secured in place when desired.

BRIEF SUMMARY OF THE DISCLOSURE

Disclosed herein is a marine vessel with a cabin (space for the crew, cargo, or passengers in the vessel) or other control unit/console movably secured to the vessel. Wherein the control unit can be moved along the vessel and secured in place when desired at various locations.

The marine vessel in one example comprises a hull with a substantially continuous deck having an upper surface. The deck comprising a forward (bow) region continuous with an aft (stern) region.

Also disclosed is an example with a plurality of channels in the deck, the channels extending from the forward region to the aft region. The channels may be aligned with the longitudinal axis of the vessel, and may be parallel to each other, the vessel having a cabin movable upon the deck. The cabin or the deck in one example having a plurality of rolling wheels or other friction reducing components attached thereto; wherein the rolling wheels roll upon the deck or against the cabin and allow longitudinal movement of the cabin between the aft region of the deck and the forward region or the deck. A drive unit (motor) may be provided to provide motive force to the cabin relative to the deck. The drive unit optionally mounted to the cabin or the deck and in one example having a drive wheel mounted to the drive unit and configured to rotate the drive wheel. The drive wheel(s) contacting the deck such that rotation of the drive wheel repositions the cabin longitudinally between the aft region and the forward region.

A latching (securing) system is also disclosed, in one example comprising at least one actuator, mounted to the cabin, or the hull, utilized to maintain position of the cabin on the deck. The term actuator as known in the art encompasses electrical, hydraulic, pneumatic, and other linear and rotational actuators, solenoids, motors, and equivalents. In one example, each actuator has a pressure rod extending therefrom which secures the cabin in place or releases the cabin to move when the actuator is actuated in either direction. The actuator interoperates with other structures to latch or secure the cabin in position relative to the deck.

Also disclosed is an example using at least one plate mounted to the cabin or deck. In the example shown, each plate has a cantilevered arm which extends under a portion of the deck or other structure; wherein the plate hinders movement of the cabin relative to the deck. In one example of the latching system, actuation of the actuator compresses a portion of the deck or structure mounted thereto against the cantilevered arm so as to hinder movement of the cabin relative to the hull.

The marine vessel may further comprise: a clamp rail mounted in each channel; wherein the upper surface of the clamp rail is in the plane of the upper surface of the deck.

The marine vessel using a clamp rail may be arranged wherein each plate has a cantilevered arm which extends under each horizontal extension of the clamp rail.

The marine vessel may further comprise a locking system which may be used in place of or simultaneously with the latching system. The locking system in one example comprising: at least one lock pin attached to the cabin or deck so as to be repositioned relative to the cabin; a surface in the deck or cabin defining at least one lock pin receiver for each lock pin; and wherein each lock pin engages a lock pin receiver and hinders movement of the cabin relative to the deck.

The marine vessel may further comprise a spring. The spring biasing the lock pin into or away from the lock pin receiver.

The marine vessel may further comprise a flexible umbilical positioned above the deck and extending from the hull to the movable cabin or control panel. The umbilical housing and protecting power and/or control conduits connecting the cabin or control panel to a vessel drive and/or steerage mechanism.

The marine vessel may further comprise a surface defining a deck drain extending from within each channel through the hull. This deck drain positioned below the upper surface of the deck so as to allow fluids on the deck to drain therefrom. In one example, the deck drain extends through the transom of the vessel.

The marine vessel may further comprise a malleable bumper positioned within a forward end of each channel. Each malleable bumper configured to mitigate impact of the plate with the forward end of the channel.

The marine vessel may further comprise a malleable bumper positioned within a rearward end of each channel. Each malleable bumper configured to mitigate impact of the plate with the rearward end of the channel.

DETAILED DESCRIPTION OF THE DISCLOSURE

Disclosed herein is a vessel cabin 20 and control panel 202 which in one example is movably mounted to a marine vessel (boat) hull 22 so as to allow for changes to the deck space available for use forward of the cabin 20 and aft of the cabin 20 as desired. The hull 22 of one example is configured to float on water and often utilizes one or more propulsion motors 24 (24a and 24b) to move the vessel in water. The propulsion motors 24 in the example shown are outboard motors mounted to the transom 26 of the hull 22, although inboard motors, inboard/outboard motors, sails, or other propulsion methods/devices may also be utilized.

The hull 22 of this example has a port side bulkhead 28a and a starboard side bulkhead 28b. A deck 30 extends laterally from the port side bulkhead 28a to the starboard side bulkhead 28b. The deck 30 is utilized for cargo, storage, movement about the vessel, mounting of hardware, passenger space, etc. The deck 30 of this example also extends longitudinally from the transom 26 to the bow 32 at a forward end 34 of the marine vessel 36. The deck 30 may have attachments thereto such as for example anchor windlasses, access hatches, cleats, winches, blocks, bollards, etc. but it will generally be desired to have the deck 30 free of obstructions. The longitudinal position of the vessel cabin 20 upon the deck 30 significantly affects the amount of unobstructed space on the forward deck region 38 relative to the amount of unobstructed space on the aft deck region 40. In other terms, a forward positioned cabin 20 reduces the space available on the forward deck 38, and a rearward positioned cabin 20 reduces the space available on the aft deck 40. Thus is disclosed herein a system for changing and securing the position of the cabin 20 on the deck 30. In prior art vessels, a balance between deck space forward of the cabin and aft of the cabin has been achieved and set dependent on the intended use of the vessel 36. For example, many fishing boats have a forward positioned cabin to provide as much aft deck space as can be achieved with a given hull, deck, and cabin size. A forward positioned cabin however may reduce performance (maneuverability) of the vessel when moving through the water. For example, as the vessel floats in water, significant weight in the forward deck region 38 may longitudinally pivot the vessel downward in the bow, and vertically lift the transom 26. This rotation predictably reducing stability of the vessel as it moves through the water, and possibly reducing the trust available from the propulsion motors 24 (a and b). Thus, it is often desired to have a substantial percentage of the weight in the stern 42 or aft region 40 of the vessel so as to improve maneuverability, stability, etc. as the marine vessel 36 moves through the water. This is often especially relevant at high speeds where with a V-shaped hull 22, there is less wetted surface (volume of the hull 22 in the water). Thus, it is often desired to have the cabin 20 positioned far aft. As the marine vessel 36 moves through the water the vessel pitches (rotates) forward/aft, and lists (tilts) port/starboard considerably especially in wind, waves, or during active steering movements. Thus, it is often desired to secure the vessel cabin 20 to the hull 22 to avoid unwanted movement of the cabin 20 on the deck 30. In addition, a control panel 44 is often provided inside the vessel cabin 20, or otherwise attached to the hull 22 to provide indicators to the operator of the vessel 36 as well as controls/actuators to allow the operator to determine and/or adjust functionality of the drive (propulsion) units 24, steerage, anchor windlasses, lights, horns, pumps, motor temperature, depth of the water under the vessel, speed of the vessel through the water. The control panel 44 may include components which require connection in some manner to other devices exterior of the cabin 20 it has previously been desired to rigidly mount the cabin 20 and control panel 44 to the hull 22 to facilitate connection between the control panel 44 and the sensors and/or components coupled thereto.

Figure 1:
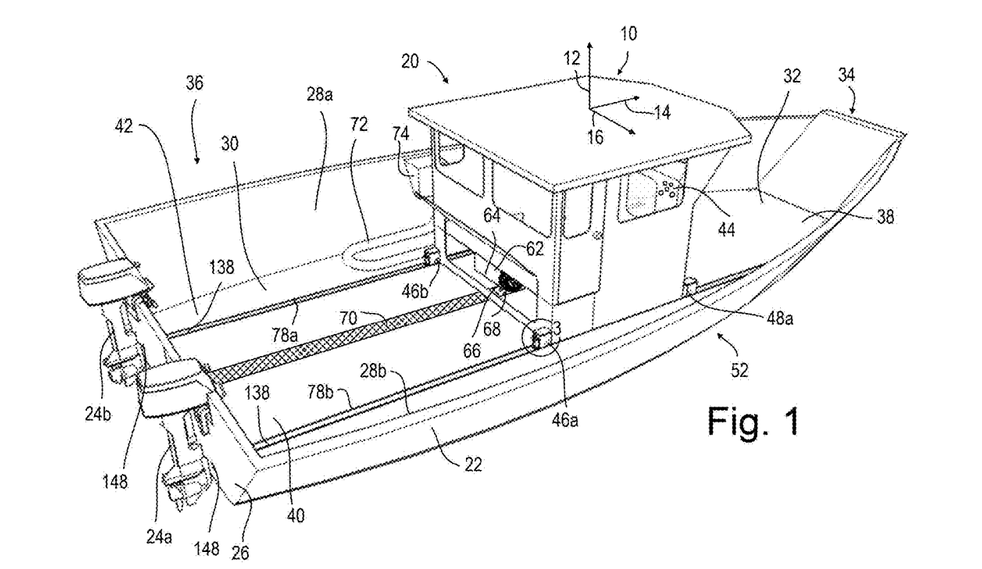
FIG. 1 is a rear perspective view of one example of the disclosed marine vessel with the moving cabin in a forward position.
Figure 2:
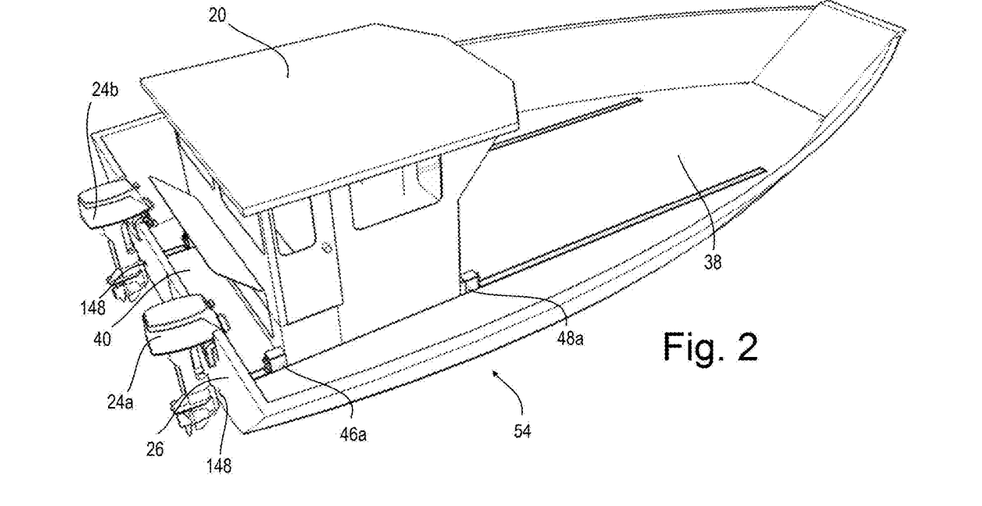
FIG. 2 rear perspective view of one example of the disclosed marine vessel with the moving cabin in an aft position.
Figures 6, 7, 8:
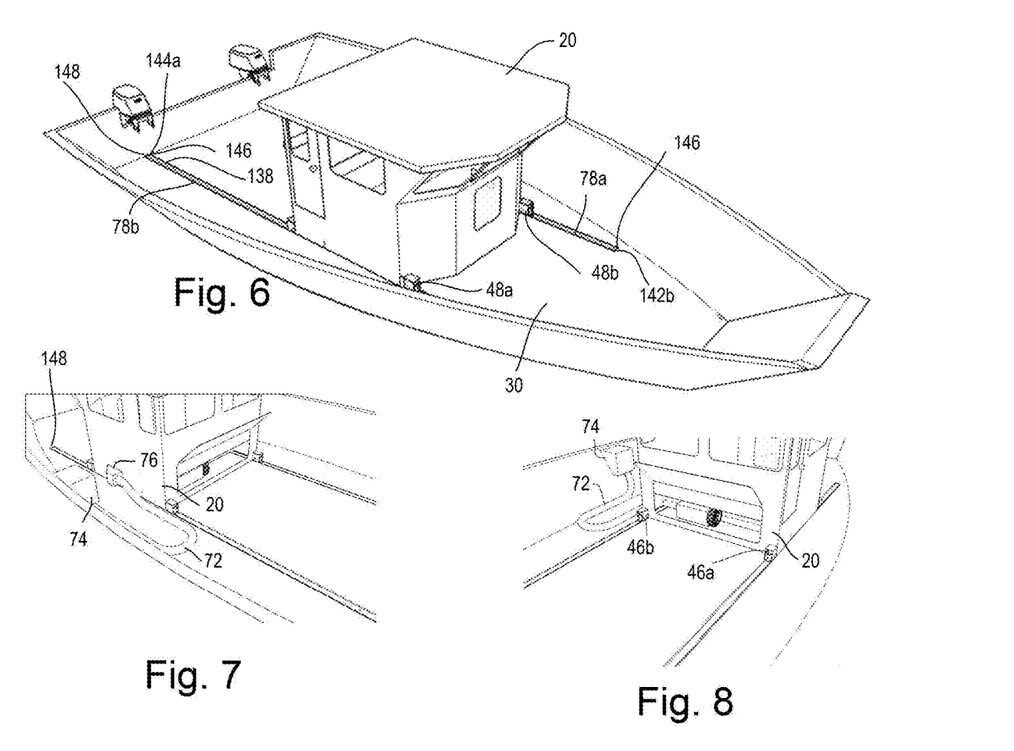
FIG. 6 is a top perspective view of the example of FIG. 1 with the cabin in a median longitudinal position on the deck of the vessel.
FIG. 7 is a rear perspective view of a region of the example shown in FIG. 1 from the opposing lateral side.
FIG. 8 shows the portions of FIG. 7 from a different angle.

In the example shown in FIG. 1, the vessel cabin 20 utilizes aft roller wheels 46a and on the starboard side of the cabin 20 and aft roller wheels 46b on the port side of the cabin 20. Likewise, as can be seen in FIG. 6, the vessel cabin 20 utilizes forward roller wheels 48a on the starboard side of the cabin 20 and forward roller wheels 48b on the port side of the cabin 20. These roller wheels roll upon the upper surface of the deck 30 and allow longitudinal 14 movement of the vessel cabin 20. For example, FIG. 1 shows the vessel 36 in a substantially forward position 52 whereas FIG. 2 shows the vessel cabin 20 in a substantially aft position. This position shown in FIG. 2 maximizes the space available in the forward deck region 38 and thus minimizes the space available in the aft deck region 40.

Figures 3, 4:
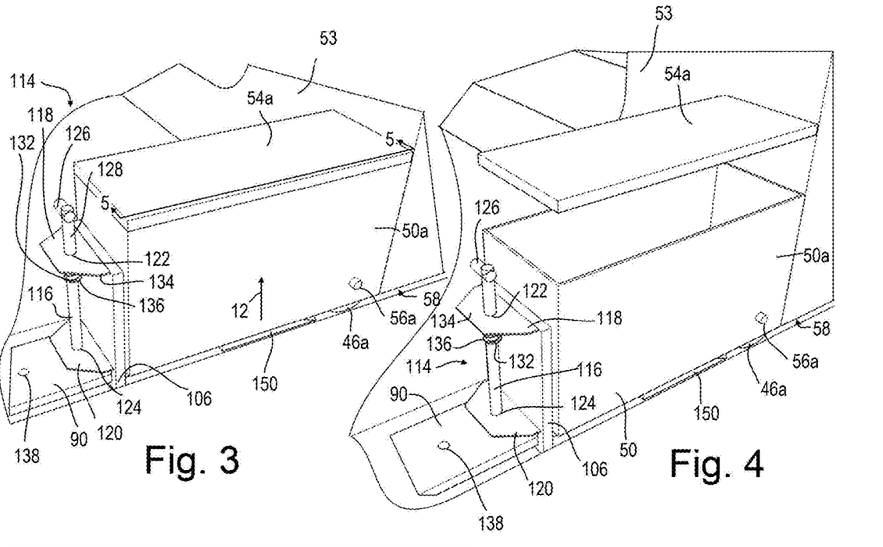
FIG. 3 is a detail view of the region 3 of FIG. 1.
FIG. 4 is a view of FIG. 3 with a removable cap lifted.

Looking to FIG. 3 is shown a detail view of the area 3 of FIG. 1. In this view, a housing 50a is shown. In this example the housing 50 contains at least one roller 46 and a latching mechanism. The housing 50 of this example is attached to the aft surface 53 of the vessel cabin 20. The housing 50a of this example having a removable cap 54a which allows access to the components therein which may include a roller, latching mechanism, and/or locking mechanism. Looking to FIGS. 5a and 5b (which are sectional views taken along line 5-5 of FIG. 3) can be seen the roller 46 having an axle 56a attached inside the housing 50a to facilitate rolling of the roller 46a upon the upper surface of the deck 30 or other structure.

The housing 50 optionally includes a removable cap 54 which protects the roller wheel 46, latching mechanism, as well as protects personnel and cargo upon the deck 30 from accidentally pinching between the roller wheels and the deck 30. As shown, a gap 58 is between the lower edge 60 of the vessel cabin 20 and the upper surface of the deck 30. This gap 58 allows freedom of movement of the vessel cabin 20 without scraping or rubbing against the deck 30 as the cabin is repositioned longitudinally 14 upon the deck 30.

In one example, the cabin 20 may be repositioned longitudinally by an operator (person) pushing and or pulling on the cabin 20. In another example, a drive unit 62 utilizes an electric motor 64, hydraulic actuator, pneumatic actuator, or similar device to provide motive force to at least one drive wheel 66, commonly having a tire 68 thereon which rides upon the upper surface of the deck 30. The drive wheel 66 of this example may be independent of the roller wheels 46. In one example, the drive unit 62 is actuated through the control panel 44, other positions within or exterior of the cabin 20, or may alternatively be operated from positions along the hull 22 or through a control held by a user. As the drive unit 62 is actuated, rotating the drive wheel(s) 66 the vessel cabin 20 is moved longitudinally 14 along the deck. In other examples, the drive unit comprises other devices such as linear actuators, cables, winches, geared devices, etc.

In one example, additional traction may be desired between the drive wheel 66 and the deck 30. Thus, a tire runner 70 may be provided. The tire runner 70 may be affixed to the deck 30. The tire runner 70 provides additional traction to the drive wheel 66 against the deck 30.

As the connections between the control panel 44 and the components within the hull 22 commonly require a wire and/or fluid conduit there between, a hollow tubular conduit umbilical 72 may be provided in which pass the wire and/or fluid conduits. The umbilical 72 as shown in FIG. 7 has a first end 74 (umbilical hull entry) attached to the hull 22 and a second end 76 (umbilical cabin entry) attached to the vessel cabin 20. Additional connections may be required or desired, such as between the motors 24 and the cabin 20, between storage batteries and the cabin 20, and in one example the motor 64. Fluid conduits may be desired, such as to provide water, coolant, hydraulic fluid, or other fluids to or from the vessel cabin 20 through the umbilical 72. In one example, the umbilical 72 is a length of flexible/reinforced hose. In one example the umbilical 72 is circumferentially rigid such that a user stepping thereupon or other weighted object will not damage any wires or conduits therein and additionally; movement of the vessel cabin 20 longitudinally will not kink, sharply bend, or sever the wires/conduits within the umbilical 72. In one example, flexible corrugated pipe such as PVC (polyvinyl chloride) pipe commonly used in yard drainage systems may be utilized for the umbilical 72. In one example, only the ends of the umbilical are attached to the vessel, the remaining portions of the umbilical slide or roll upon the deck as the cabin 20 repositions longitudinally.

The umbilical 72 is often positioned above the deck and in one example rests upon the deck so as to eliminate any fixed deck obstructions, such as channels, hatches, and outlets in the deck 30.

Once the desired longitudinal position of the vessel cabin 20 is achieved, it will be desired to maintain this position relative to the deck 30. Although other securement devices and methods can be utilized, a latching system and a locking system are disclosed herein to maintain the position of the vessel cabin 20 at a desired longitudinal position. The latching system and locking system may be operated independent of each other.

Figure 9:
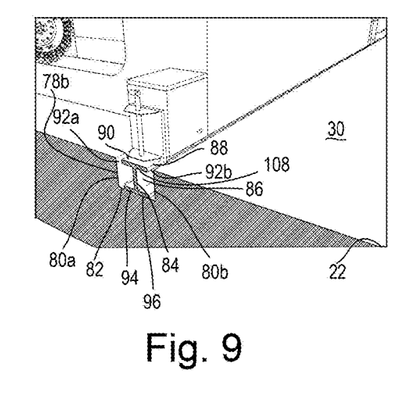
FIG. 9 is a cutaway view of the example shown in FIG. 3.

Looking to FIG. 9 is shown an example wherein recessed channels 78 are provided at port and starboard regions of the deck 30. The port channel 78a and starboard channel 78b may be identical or mirror images of each other, and may be aligned parallel to each other while substantially aligned with the longitudinal axis 10 of the vessel. In the example shown, each channel 78 comprises vertical walls 80 extending downward from the upper surface of the deck 30. The walls 80 having a lower surface 82 extending there between. A clamp rail 84 having a vertical extension 86 extending from the lower surface 82 of the channel 78 is shown within the channel. The clamp rail 84 having a horizontal cross member 88 with an upper surface 90 which the locking and/or latching mechanisms may engage. In one example, the upper surface 90 of the clamp rail 84 is substantially in the same plane as the upper surface of the deck 30, so as to provide little or no obstruction to the deck 30. As shown, a gap 92 is provided on one or both lateral sides of the cross member 88 to allow for passage of part of a latching system and/or part of the locking system. In the example of FIG. 9, the clamp rail 84 further comprises a lower cross member 94.

Movement of the vessel cabin 20 upon the deck 30 changes the weight distribution of the vessel 36 and changes the available open cargo/open space on the forward and aft regions of the deck 30. As securement of the vessel cabin 20 is often desired once the desired position is achieved; a latching system 140 and a separate locking system 114 will be described. The latching system 140 is provided for ease in securing the vessel cabin 20 at any (non-indexed) desired longitudinal position along the channels 78. The locking system 140 is provided for a more secure (and optionally indexed) system for securing the vessel cabin 20 along the channels 78.

Figures 5A, 5B:
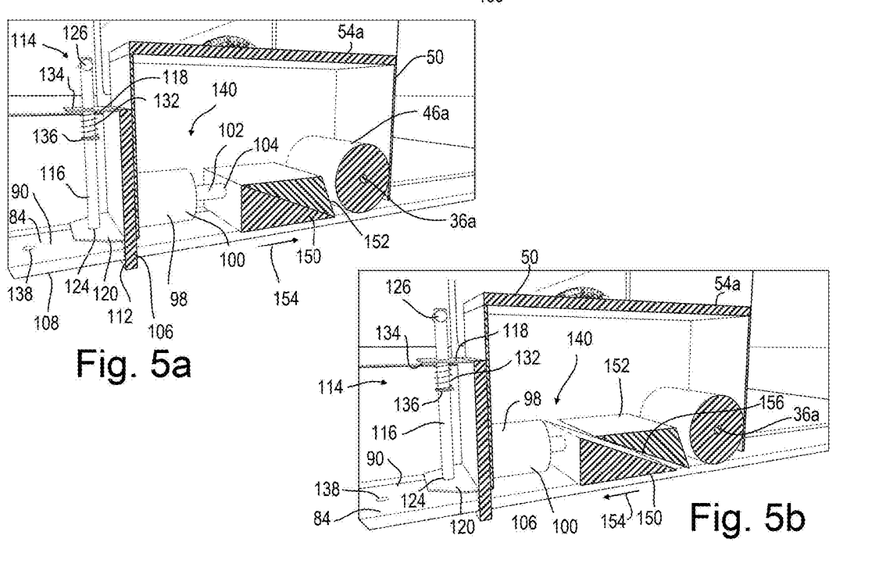
FIG. 5a is a cutaway view taken along line 5-5 of FIG. 3 with the actuator in an extended position.
FIG. 5b is a cutaway view taken along line 5-5 of FIG. 3 with the actuator in a withdrawn position.

Looking to FIGS. 5a and 5b, a latch actuator 98 is shown attached to the vessel cabin 20 inside the actuator housing 50. The actuator 98 comprising an actuator housing 100 and a pressure rod 102 extending therefrom. The pressure rod 102 of this example has a distal end 104 which in this example is attached to a first wedge 150. The term wedge is used in this disclosure to identify a tool, generally an inclined plane. Such a wedge can be used to separate two objects or portions of an object, lift up an object, or hold an object in place. A wedge functions by converting a force applied to its blunt end into forces generally perpendicular (normal) to its inclined surfaces. The mechanical advantage of a wedge is given by the ratio of the length of its slope to its width. In this in this example, linear force exerted by the actuator 98 is translated to gripping of the clamp rail 84 between cantilevered arm(s) 112 of a latch plate 106 fixed to the cabin and the first wedge 150, thus hindering movement of the cabin 20 on the deck 30.

The first wedge 150 interoperates with a surface 152 to control movement of the cabin 20 on the deck 30. In other terms, activating of the latch actuator 98 results in a portion of the clamp rail 84 of the deck 30 or hull 22 pressing against the latch plate 106 and the wedge 150 so as to hinder movement of the cabin relative to the hull.

Although the first wedge 150 is shown as triangular components in cross-section, other shapes may work equally as well. Also, the first wedge 150 is shown moving horizontally relative to the deck 30 in this example, but may be arranged in other orientations. The contact surfaces are shown as planar, although curved surfaces also function. In the example shown, movement of the first wedge 150 against the surface 152 in direction of travel 154 drives the first wedge 150 against the upper surface of the deck. Conversely, movement of the first wedge 150 against the surface 152 in direction of travel 154 reduces and relieves tension between the first wedge 150 and the surface of the deck 30.

Figure 10:
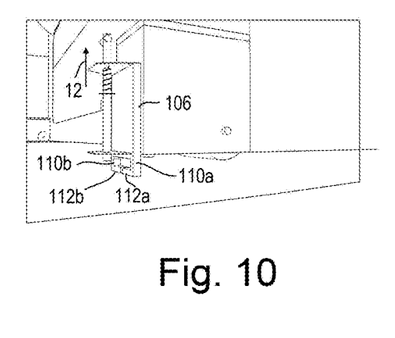
FIG. 10 is a view of the example shown in FIG. 3 with the deck, channel, and clamp rail removed to show the remaining components.

In one example as shown, the actuator interoperating with the first wedge provides sufficient pressure to move at least a portion of the cabin 20 away from the deck 30. This movement then drives a (latch) plate 106 (securely mounted to at least one roller/actuator housing 50) into contact with the underside 108 of the cross member 88 and thus securely engages the cabin in position upon the deck 30. Looking to FIG. 10, it can be seen that in this example, the latch plate 106 has a plurality of downward extending portions 110 (a and b). These vertically downward extending portions 110 also restrict lateral movement of the cabin 20 relative to the deck 30 when these extending portions 110 engage the sides of the cross member 88. Also shown are a plurality of cantilevered arm 112a and 112b which extend under the cross member 88 and contact the underside 108 of the cross member 88 when the latch actuator 98 is engaged.

As the latch actuator 98 is released or pressurized in the opposing direction, the first wedge 150 moves away from the surface 152 and the cabin 20 moves toward the deck 30, engaging the rollers on the deck, and the cabin is free to reposition.

Looking to FIG. 3 is shown example of a cooperating locking system 114. The locking system secures the cabin 20 in place on the deck. In this example, the locking system 114 is attached (mounted) to the roller/actuator housing 50 although it may alternatively be attached to other components or surfaces of the vessel cabin 20 or vessel 36. The locking system 114 of this example comprises a lock pin 116 which passes through an upper lock pin plate 118 and lower lock pin plate 120. Each lock pin plate of this example having a surface defining a void (122 and 124) there through to allow movement of the lock pin 116 relative to the lock plates 118 and 120. The lock pin 116 in this example comprises a user engagement portion 126 which allows a user to easily grasp the lock pin 116 and reposition it 12, away from the upper surface 90 of the clamp rail 84 to release the locking system 114. Mechanical devices such as linear or rotational actuators and magnetic latches may alternatively be used. When released, (assuming the latching system 140 is also released), the vessel cabin 20 is free to be repositioned along the deck 30.

The lock pin 116 may include a protrusion 128 so sized and configured to pass through a surface defining an opening 130 in either lock plate when rotationally aligned. When rotationally offset, the protrusion 128 contacts the lock plate and prohibits longitudinal repositioning of the lock pin 116.

In one example, a biasing spring 132 or equivalent may be provided to keep the locking system 114 from inadvertently engaging or disengaging. In one example the spring 132 is a compression spring extends from the underside 134 of either the upper lock plate 118 or the lower lock plate 120 and engages a surface 136 such as a ring, protrusion, or step in the lock pin 116. A compression spring in this position would bias the lock pin 116 toward the deck 30. When protrusion 128 is aligned with the opening 130, the protrusion may pass the lock plate 118.

To utilize the locking system 114, the vessel cabin 20 is repositioned such that at least one lock pin 116 is aligned with a lock pin receiver 138. In example shown, the lock pin receiver 138 is a surface defining a hole in the surface 90 of the clamp rail 84, deck 30, or other portion of the vessel 36. Once these components are so aligned, the lock pin 116 of the example shown may be repositioned so as to be inserted into the lock pin receiver 138 further prohibiting movement of the cabin 20 relative to the deck 30.

As can be seen in FIG. 1, lock pin receivers 138 may operate in pairs on laterally opposing sides of the cabin 20.

The locking system 114 may be utilized in conjunction with (simultaneously with) the latching system 140 previously described.

In one example the indexed locking system may utilize lock pin receivers 138 at specific desired positions along the deck 30. For example, as it is often desired to have the vessel cabin 20 at an aft position as shown in FIG. 2, lock pin receivers 138 (see FIG. 1) are provided to facilitate locking of the cabin in this aft position. This aft position allows a maximum amount of unobstructed deck space 38 forward of the cabin 20 for cargo, crew, passengers, and equipment, and in some hull configurations provides maximum maneuverability at high-speed. Other lock pin receivers may be placed to coincide with a full forward positon of the cabin 20, and intermediate positions as desired.

As the vessel cabin 20 is repositioned forward and rearward, it may be desired in some examples to provide a shock absorbing structure at the forward end 142 and rearward end 144 of each channel 78. In one example, the shock absorbing structure may be a malleable bumper 146, spring, or equivalent. The shock absorbing structure may be positioned below the deck 30 at each end (142/144) of each channel 78. Each malleable bumper 146 may be composed of closed cell foam, polymer, rubber, plastic, wood, springs, etc. and combinations thereof. The malleable bumper 146 in one example engages the protruding portion of the latch plate 106 or other component of the cabin which extends into each channel 78.

In addition, as water and other fluids often accumulate on an open deck 30 either from wind, waves, rain, spillage, etc., a deck drain 148 may be provided. Each deck drain 148 comprising a surface defining a void through the transom 26 or other region of the hull 22. Each deck drain 148 of the example shown in FIG. 1 fluidly coupling with a channel 78 so as to drain a channel 78 through the transom 26 or other region of the hull 22 without the requirement of a pump or equivalent apparatus. A flapper (backwater) valve or similar structure may be provided in each deck drain 148 to reduce the amount of back flow through the deck drain 148. This arrangement allows the laterally and vertically open region of each channel 78 to form a fluid conduit, open at the top, for fluids to drain off of the deck 30 and out of the vessel.

Figure 11:
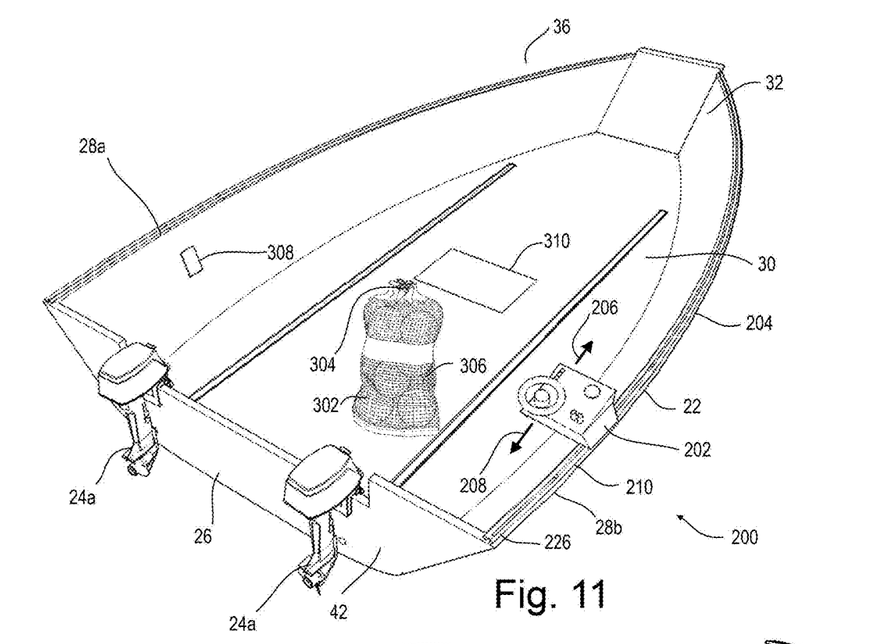
FIG. 11 is a perspective view of another example of the hull shown in FIG. 1 where the control panel if movably attached to the hull.

Looking to FIG. 11 is shown another example 200 wherein a control panel 202 is mounted to the bulkhead 28 or other structure of the vessel such as the transom 26 in such a way as to allow longitudinal and/or lateral and/or transverse repositioning. In the example shown in FIG. 11 movement is facilitated longitudinally from the aft region of the hull 22 to the forward region of the hull 22. In this example 200, a cabin (an enclosure in which the operator and optionally passengers are protected) may not be provided, although a bimini cover (see U.S. Pat. No. 6,983,716 for an example), umbrella, roof, or windshield, etc. may be provided attached to the control panel 202 or to the hull 22.

In this example, the control panel 202 is mounted to the upper edge 204 of the bulkhead 28 and configured to be longitudinally repositioned there along in either a forward direction 206 or in a rearward direction 208. This allows the cargo, passengers, and operator of the control panel 202 to be positioned in varying positions along the deck 30 has desired.

In the example 200 shown, the control panel 202 is attached to the starboard bulkhead 28b although it could be attached to the port bulkhead 28a, transom 26, bow 32. Alternatively, separate control panels 202 could be attached at various positions on the hull 22.

Figures 12, 13, 14:
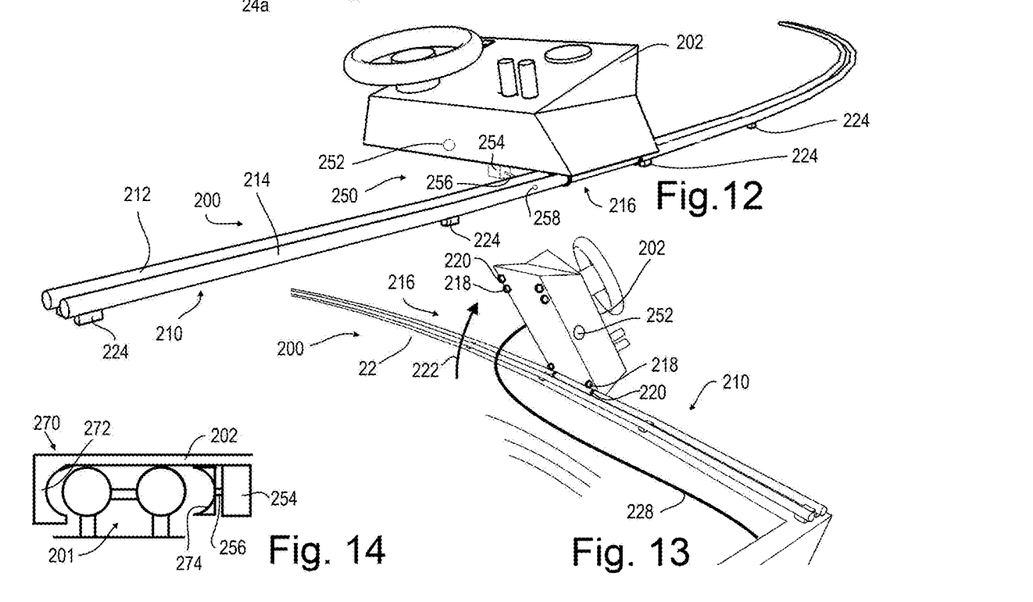
FIG. 12 is an enlarged view of several components of the device shown in FIG. 11.
FIG. 13 is another view of the device shown in FIG. 12 with the control panel in a raised or rotated position.
FIG. 14 is a highly schematic end view of another clamping system used in the Example of FIG. 11.

In the example 200 shown in FIG. 11-13, the control panel 202 is movably and optionally removably attached to a clamp rail 210. The clamp rail 210 of this example extends longitudinally along the hull 22 allowing for longitudinal movement, although it may be attached laterally or transversely in other examples. In this example, the clamp rail 210 is attached to an upper edge of the bulkhead 28 (a/b) although it could also be attached to other components of the hull 22, directly or indirectly.

In the example shown, the clamp rail 26 comprises an inner guide rail 212 and an outer guide rail 214 horizontally offset from the inner guide rail 212. In other examples, the guide rails may be offset vertically, or both vertically and horizontally offset.

Looking to FIG. 13 it can be seen that the control panel 202 comprises a clamping or securing apparatus/system 216 fixed thereto for releasable connection to the clamp rail 210. The clamping apparatus 216 of this example comprising an inner clamp 218 mounted to the inner guide rail 212, and an outer clamp 220 mounted to the outer guide rail 214.

In example shown in FIG. 13, the outer guide rail 214 is substantially circular in cross-section. Such a circular cross section may be a straight cylinder, or curved cylinder as shown in FIG. 12. Other cross sectional shapes may be used or combined with regions of cylindrical guide rail. Such a cylindrical guide rail allows the control panel 202 to be rotated 222 upward, and outward out of the way. This position is accomplished when the control panel is not needed, such as when it is desired to move cargo or passengers upon the deck 30 without impacting or being obstructed by the control panel 202. To accomplish this, in the example shown, the inner clamp 218 is released and optionally the outer clamp 220 is loosened to allow rotation of the control panel 202 around the guide rail 214 such that the inner edge and most of the control panel 202 rotates upward and outward. Alternatively, the outer clamp 220 is released and optionally the inner clamp 218 is loosened to allow rotation of the control panel 202 around the guide rail 212 downward. In one example, the inner clamp 218 and outer clamp 220 each comprise one or more releasable connectors. By way of example, one such releasable connector is shown in U.S. Pat. No. 3,705,737 incorporated herein by reference.

In the example shown in FIG. 11, the clamp rail 210 extends from the transom 26 to the bow 32. In one example, the clamp rail 210 may be sectional, or may extend only along a portion of the hull 22. As shown, the clamp rail 210 is offset from the 28 by way of a plurality of supports 224. Where the paired guide rail arrangement described above is utilized, offsets 226 may also be used, to maintain the offset between the guide rails.

FIG. 13 also shows an umbilical 228 extending from the control panel 202 equivalent to the umbilical 72 described above. Alternatively, the umbilical 228 may be a simple wire bundle providing signal and power between the steering mechanism, throttle, indicators, switches, etc. of the control panel 202 to components fixed to the hull 22.

FIG. 12 also shows an example utilizing a powered locking mechanism 250. In this example, a switch 252 is connected to an actuator 254 so as to reposition a locking pin 256 into surfaces defining holes 258 in the hull 22. The actuator 254 may be a linear actuator such as a hydraulic or pneumatic solenoid or maybe a rotary actuator such as a rack and pinion driven by a rotary motor or rotary device with a piston arm. Other embodiments may also be utilized.

Looking to FIG. 14 is shown an example where the clamping system 270 has a first portion 272 fixed to the control panel 202 and a second portion 274 fixed to the actuator pin 256. When released, as shown, the control panel 202 is free to be lifted from the hull 22, and when placed onto the guide rail(s) or bulkhead 28, and the switch 252 is actuated, the second portion 274 moves toward the first portion 272 and the control panel 202 is thus clamped to the guide rail 210.

In another example the clamping apparatus 216 is configured to mount directly to the hull 22. In one example the clamping apparatus 216 clamps to the upper edge 204 of the bulkhead(s) 28 without an additional guide rail(s).

FIG. 11 shows a floatation aid system 300 used to provide buoyancy to the vessel 36 in either configuration. The floatation aid system 300 conceived to increase buoyancy of the vessel, especially in the event of damage to the hull 22. For example, a projectile or spearing object puncturing the hull may result in water intrusion into the hull 22. The floatation aid system 300 conceived to reduce the airspace volume into which water may intrude by filling this space with a water impermeable component. The floatation aid system 300 comprising a flexible container 302. Water impermeable dry bags, mesh bags, fabric bags, etc. work well for such a container as they easily fit through bulkhead hatches 308, deck hatches 310, and equivalents where they can be contained within sections of the hull 22. The flexible containers 302 can be stored within the hull 22, or attached there to as needed. Each flexible container 304 closeable by way of a closable opening 304. Each flexible container 302 containing a plurality of independently buoyant, water impermeable vessels 306. A projectile or spearing object puncturing the hull 22 may also puncture one or more of the vessels 306, but is unlikely to result in water intrusion into enough of the vessels 306 to result in sinking of the hull 22, given that sufficient water impermeable vessels 306 are provided. While hollow balls such as tennis balls, soccer balls, tennis balls etc. Would well in such applications, non-spherical shapes may also be effective such as cylinders, irregular shapes such as closed cell foam, etc. The containers 302 once filled are easily stored in the hull 22 yet still maintain airflow reducing water retention, oxidation, water absorption, and electrolysis.

While the present invention is illustrated by description of several embodiments and while the illustrative embodiments are described in detail, it is not the intention of the applicants to restrict or in any way limit the scope of the appended claims to such detail. Orientations such as horizontal, vertical, longitudinal, transverse, and lateral are used to describe relative axes and are not intended to imply that the apparatus is limited to a specific orientation. Additional advantages and modifications within the scope of the appended claims will readily appear to those sufficed in the art. The invention in its broader aspects is therefore not limited to the specific details, representative apparatus and methods, and illustrative examples shown and described. Accordingly, departures may be made from such details without departing from the spirit or scope of applicants' general concept.

The invention claimed is:

1. A water vessel comprising:
    the water vessel comprising a forward region and an aft region;
    a control unit movably affixed to the vessel;
    wherein the control unit is movable between the aft region and the forward region;
    a securing system selectively securing the control unit to the hull;
    a plurality of parallel longitudinally aligned channels extending from the forward region to the aft region;
    a clamp rail mounted in each channel; and
    the upper surface of the clamp rail is substantially even with the upper surface channel.

2. The water vessel as recited in claim 1 wherein the plate extends under horizontal extensions of the clamp rail.

3. The water vessel as recited in claim 1 further comprising an indexed locking system.

4. The water vessel as recited in claim 3 where in the locking system further comprises:
    at least one lock pin attached to the cabin so as to be vertically repositioned relative to the cabin;
    at least one surface in the deck defining at least one lock pin receiver for each lock pin; and wherein each lock pin engages a lock pin receiver and prohibits horizontal movement of the cabin relative to the vessel.

5. The water vessel as recited in claim 4 further comprising a spring biasing the lock pin into the lock pin receiver.

6. The water vessel as recited in claim 1 further comprising a surface defining a deck drain extending through the hull into each channel below the upper surface of the channel.

7. The water vessel as recited in claim 1 further comprising a malleable bumper positioned within a forward end of each channel, each malleable bumper configured to mitigate impact of the plate with the forward end of the channel.

8. The water vessel as recited in claim 1 further comprising a malleable bumper positioned within a rearward end of each channel, each malleable bumper configured to mitigate impact of the plate with the rearward end of the channel.

9. A water vessel comprising:
a forward region and an aft region;
a control unit movably affixed to the vessel;
wherein the control unit is movable between the aft region and the forward region;
a securing system selectively securing the control unit to the hull;
wherein the control panel is movably attached to a clamp rail extending longitudinally along the hull; and
wherein the control panel is rotationally attached to the clamp rail so as to rotate in a vertical plane about the clamp rail.

10. The water vessel as recited in claim 9 further comprising a powered locking mechanism removably coupling the control panel to the clamp rail.

11. The water vessel as recited in claim 9 wherein the water vessel comprises a deck, wherein the control panel is rotationally attached to the clamp rail so as to rotate in a vertical plane about the clamp rail from a first position vertically above the deck to a second position not above the deck, thus not obstructing the deck.

12. The water vessel as recited in claim 9 wherein the control unit is contained within a cabin.

13. A water vessel comprising:
the water vessel comprising a forward region and an aft region;
a control unit movably affixed to the vessel;
wherein the control unit is movable between the aft region and the forward region;
a securing system selectively securing the control unit to the hull;
the control panel is contained within a cabin;
at least one actuator;
each actuator having a pressure rod extending therefrom and actuator fixed to a wedge;
at least one plate mounted to the cabin;
each plate having a cantilevered arm extending under a portion of the vessel;
wherein the plate hinders movement of the cabin away from the vessel; and
wherein actuation of the actuator grips a portion of a clamp rail between the plate and the wedge so as to hinder movement of the cabin relative to the vessel.

14. The water vessel as recited in claim 13 further comprising a flexible umbilical extending from the hull to the cabin, the flexible umbilical housing power and/or control conduits from the cabin to a vessel drive and/or steerage mechanism.

15. The water vessel as recited in claim 13 further comprising a plurality of parallel longitudinally aligned channels extending from the forward deck to the aft deck; and a surface defining a deck drain extending through the hull into each channel below the upper surface of the deck.

16. The water vessel as recited in claim 13 further comprising a plurality of parallel longitudinally aligned channels extending from the forward deck to the aft deck; and a malleable bumper positioned within an end of each channel, each malleable bumper configured to mitigate impact of the plate with the forward end of the channel.

17. The water vessel as recited in claim 13 wherein the control panel is movably attached to a clamp rail extending longitudinally along the hull.

18. The water vessel as recited in claim 17 wherein the control panel is rotationally attached to the clamp rail so as to rotate in a vertical plane about the clamp rail.

19. The water vessel as recited in claim 17 further comprising a powered locking mechanism removably coupling the control panel to the clamp rail.

* * * * *